(12) United States Patent
Hirsch

(10) Patent No.: US 10,194,228 B2
(45) Date of Patent: Jan. 29, 2019

(54) LOAD BALANCING TO MAXIMIZE DEVICE FUNCTION IN A PERSONAL AREA NETWORK DEVICE SYSTEM AND METHOD

(71) Applicant: BRAGI GmbH, München (DE)

(72) Inventor: Eric Christian Hirsch, München (DE)

(*) Notice: Subject to any disclaimer, the term of this patent is extended or adjusted under 35 U.S.C. 154(b) by 4 days.

(21) Appl. No.: 15/245,011

(22) Filed: Aug. 23, 2016

(65) Prior Publication Data

US 2017/0064428 A1    Mar. 2, 2017

Related U.S. Application Data

(60) Provisional application No. 62/211,743, filed on Aug. 29, 2015.

(51) Int. Cl.
*H04R 1/10* (2006.01)
*G06F 1/16* (2006.01)
(Continued)

(52) U.S. Cl.
CPC .......... *H04R 1/1025* (2013.01); *G06F 1/163* (2013.01); *G06F 1/325* (2013.01); *G06F 1/3287* (2013.01);
(Continued)

(58) Field of Classification Search
CPC .. H04R 1/1025; H04R 1/1016; H04R 1/1041; H04R 1/1091; H04R 2420/07;
(Continued)

(56) References Cited

U.S. PATENT DOCUMENTS 3,934,100 A    1/1976 Harada
4,150,262 A    4/1979 Ono
(Continued)

FOREIGN PATENT DOCUMENTS

EP    1017252 A2    7/2000
GB    2074817    4/1981
(Continued)

OTHER PUBLICATIONS

Announcing the $3,333,333 Stretch Goal (Feb. 24, 2014).
(Continued)

*Primary Examiner* — Matthew Eason
*Assistant Examiner* — Sabrina Diaz
(74) *Attorney, Agent, or Firm* — Goodhue, Coleman & Owens, P.C.

(57) ABSTRACT

A system includes a first device comprising a housing, a battery disposed within the housing, an intelligent control disposed within the housing, a transceiver disposed within the housing and operatively connected to the intelligent control, and a plurality of sensors operatively connected to the intelligent control. The system further includes a second device comprising a housing, a battery disposed within the housing, an intelligent control disposed within the housing, a transceiver disposed within the housing and operatively connected to the intelligent control, and a plurality of sensors operatively connected to the intelligent control. The first device and the second device provide for balancing load by powering one or more of the biosensors in one of the first device or the second device and shifting functions to the other of the first device and the second device.

19 Claims, 5 Drawing Sheets

(51) Int. Cl.
*G06F 1/32* (2006.01)
*H04W 52/02* (2009.01)

(52) U.S. Cl.
CPC ......... *H04R 1/1016* (2013.01); *H04R 1/1041* (2013.01); *H04R 1/1091* (2013.01); *H04R 2420/07* (2013.01); *H04W 52/0274* (2013.01); *Y02D 70/00* (2018.01); *Y02D 70/166* (2018.01); *Y02D 70/26* (2018.01)

(58) Field of Classification Search
CPC .... H04R 25/30; G06F 1/163; H04W 52/0274; H04W 52/0296; H04W 52/00; H04W 52/02; Y02B 60/50; H02J 7/00
USPC .......................................... 381/74, 312, 323
See application file for complete search history.

(56) References Cited

U.S. PATENT DOCUMENTS

| | | | |
|---|---|---|---|
| 4,334,315 A | 6/1982 | Ono et al. | |
| 4,375,016 A | 2/1983 | Harada | |
| 4,588,867 A | 5/1986 | Konomi | |
| 4,654,883 A | 3/1987 | Iwata | |
| 4,682,180 A | 7/1987 | Gans | |
| 4,791,673 A | 12/1988 | Schreiber | |
| 4,865,044 A | 9/1989 | Wallace et al. | |
| 5,191,602 A | 3/1993 | Regen et al. | |
| 5,201,007 A | 4/1993 | Ward et al. | |
| 5,280,524 A | 1/1994 | Norris | |
| 5,295,193 A | 3/1994 | Ono | |
| 5,298,692 A | 3/1994 | Ikeda et al. | |
| 5,343,532 A | 8/1994 | Shugart | |
| 5,363,444 A | 11/1994 | Norris | |
| 5,497,339 A | 3/1996 | Bernard | |
| 5,606,621 A | 2/1997 | Reiter et al. | |
| 5,613,222 A | 3/1997 | Guenther | |
| 5,692,059 A | 11/1997 | Kruger | |
| 5,721,783 A | 2/1998 | Anderson | |
| 5,749,072 A | 5/1998 | Mazurkiewicz et al. | |
| 5,771,438 A | 6/1998 | Palermo et al. | |
| 5,802,167 A | 9/1998 | Hong | |
| 5,929,774 A | 7/1999 | Charlton | |
| 5,933,506 A | 8/1999 | Aoki et al. | |
| 5,949,896 A | 9/1999 | Nageno et al. | |
| 5,987,146 A | 11/1999 | Pluvinage et al. | |
| 6,021,207 A | 2/2000 | Puthuff et al. | |
| 6,054,989 A | 4/2000 | Robertson et al. | |
| 6,081,724 A | 6/2000 | Wilson | |
| 6,094,492 A | 7/2000 | Boesen | |
| 6,111,569 A | 8/2000 | Brusky et al. | |
| 6,112,103 A | 8/2000 | Puthuff | |
| 6,157,727 A | 12/2000 | Rueda | |
| 6,167,039 A | 12/2000 | Karlsson et al. | |
| 6,181,801 B1 | 1/2001 | Puthuff et al. | |
| 6,208,372 B1 | 3/2001 | Barraclough | |
| 6,275,789 B1 | 8/2001 | Moser et al. | |
| 6,339,754 B1 | 1/2002 | Flanagan et al. | |
| 6,408,081 B1 | 6/2002 | Boesen | |
| D464,039 S | 10/2002 | Boesen | |
| 6,470,893 B1 | 10/2002 | Boesen | |
| D468,299 S | 1/2003 | Boesen | |
| D468,300 S | 1/2003 | Boesen | |
| 6,542,721 B2 | 4/2003 | Boesen | |
| 6,560,468 B1 | 5/2003 | Boesen | |
| 6,654,721 B2 | 11/2003 | Handelman | |
| 6,664,713 B2 | 12/2003 | Boesen | |
| 6,694,180 B1 | 2/2004 | Boesen | |
| 6,718,043 B1 | 4/2004 | Boesen | |
| 6,738,485 B1 | 5/2004 | Boesen | |
| 6,748,095 B1 | 6/2004 | Goss | |
| 6,754,358 B1 | 6/2004 | Boesen et al. | |
| 6,784,873 B1 | 8/2004 | Boesen et al. | |
| 6,823,195 B1 | 11/2004 | Boesen | |
| 6,852,084 B1 | 2/2005 | Boesen | |
| 6,879,698 B2 | 4/2005 | Boesen | |
| 6,892,082 B2 | 5/2005 | Boesen | |
| 6,920,229 B2 | 7/2005 | Boesen | |
| 6,952,483 B2 | 10/2005 | Boesen et al. | |
| 6,987,986 B2 | 1/2006 | Boesen | |
| 7,136,282 B1 | 11/2006 | Rebeske | |
| 7,203,331 B2 | 4/2007 | Boesen | |
| 7,209,569 B2 | 4/2007 | Boesen | |
| 7,215,790 B2 | 5/2007 | Boesen et al. | |
| 7,463,902 B2 | 12/2008 | Boesen | |
| 7,508,411 B2 | 3/2009 | Boesen | |
| 7,983,628 B2 | 7/2011 | Boesen | |
| 8,140,357 B1 | 3/2012 | Boesen | |
| 2001/0005197 A1 | 6/2001 | Mishra et al. | |
| 2001/0027121 A1 | 10/2001 | Boesen | |
| 2001/0056350 A1 | 12/2001 | Calderone et al. | |
| 2002/0002413 A1 | 1/2002 | Tokue | |
| 2002/0007510 A1 | 1/2002 | Mann | |
| 2002/0010590 A1 | 1/2002 | Lee | |
| 2002/0030637 A1 | 3/2002 | Mann | |
| 2002/0046035 A1 | 4/2002 | Kitahara et al. | |
| 2002/0057810 A1 | 5/2002 | Boesen | |
| 2002/0076073 A1 | 6/2002 | Taenzer et al. | |
| 2002/0118852 A1 | 8/2002 | Boesen | |
| 2003/0065504 A1 | 4/2003 | Kraemer et al. | |
| 2003/0100331 A1 | 5/2003 | Dress et al. | |
| 2003/0104806 A1 | 6/2003 | Ruef et al. | |
| 2003/0115068 A1 | 6/2003 | Boesen | |
| 2003/0125096 A1 | 7/2003 | Boesen | |
| 2003/0218064 A1 | 11/2003 | Conner et al. | |
| 2004/0070564 A1 | 4/2004 | Dawson et al. | |
| 2004/0160511 A1 | 8/2004 | Boesen | |
| 2005/0043056 A1 | 2/2005 | Boesen | |
| 2005/0125320 A1 | 6/2005 | Boesen | |
| 2005/0148883 A1 | 7/2005 | Boesen | |
| 2005/0165663 A1 | 7/2005 | Razumov | |
| 2005/0196009 A1 | 9/2005 | Boesen | |
| 2005/0251455 A1 | 11/2005 | Boesen | |
| 2005/0266876 A1 | 12/2005 | Boesen | |
| 2006/0029246 A1 | 2/2006 | Boesen | |
| 2006/0074671 A1 | 4/2006 | Farmaner et al. | |
| 2006/0074808 A1 | 4/2006 | Boesen | |
| 2008/0254780 A1 | 10/2008 | Kuhl et al. | |
| 2009/0197532 A1* | 8/2009 | Wyper | H04M 1/6066 455/41.2 |
| 2013/0316642 A1* | 11/2013 | Newham | H04W 52/0206 455/11.1 |
| 2016/0073189 A1* | 3/2016 | Linden | H04R 1/1025 381/74 |
| 2016/0224392 A1* | 8/2016 | Clarke | G06F 9/505 |

FOREIGN PATENT DOCUMENTS

| | | | |
|---|---|---|---|
| JP | 06292195 | 10/1998 | |
| WO | 2014043179 A2 | 3/2014 | |
| WO | 2015110577 A1 | 7/2015 | |
| WO | 2015110587 A1 | 7/2015 | |
| WO | 2015127056 A2 | 8/2015 | |
| WO | WO 2015/127056 * | 8/2015 | ............. G01C 23/00 |

OTHER PUBLICATIONS

BRAGI Is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, A Lot to Be Done Over Christmas (Dec. 22, 2014).
BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).

(56) References Cited

OTHER PUBLICATIONS

BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People @BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing-Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, on Track(May 16, 2015).
BRAGI Update—Beta2 Production and Factory Line(Aug. 20, 2015).
BRAGI Update—Certifications, Production, Ramping Up (Nov. 13, 2015).
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2014).
BRAGI Update—On Track, Design Verification, How It Works and What's Next(Jul. 15, 2015).
BRAGI Update—On Track, on Track and Gems Overview (Jun. 24, 2015).
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Last Push Before the Kickstarter Campaign Ends on Monday 4pm CET (Mar. 28, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for the Dash (Feb. 12, 2014).
Stretchgoal—Windows Phone Support (Feb. 17, 2014).
The Dash + The Charging Case & The BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).
International Search Report & Written Opinion, PCT/EP16/70244 (dated Nov. 23, 2016).

* cited by examiner

US 10,194,228 B2

LOAD BALANCING TO MAXIMIZE DEVICE FUNCTION IN A PERSONAL AREA NETWORK DEVICE SYSTEM AND METHOD

PRIORITY STATEMENT

This application claims priority to U.S. Provisional Patent Application No. 62/211,743, filed Aug. 29, 2016, hereby incorporated by reference in its entirety.

FIELD OF THE INVENTION

The present invention relates to wearable devices. More particularly, but not exclusively, the present invention relates to power management associated with wearable devices.

BACKGROUND OF THE ART

Power management is a critical aspect of all battery reliant devices. The user expects such devices to provide highly accurate and instantaneous responses from the device for the feature being utilized. However, such responsiveness comes at the price of increased power drain on the available resources. Such power demands limits device functionality by creating a rate limiting effect induced through power drain. What is needed is a system and method designed to maintain high quality function of the features of the device while preserving power.

SUMMARY

Therefore, it is a primary object, feature, or advantage to improve over the state of the art.

It is a further object, feature, or advantage to provide power management in battery devices.

It is a still further object, feature, or advantage to maximize battery life through load sharing between two devices with similar sensor sets.

It is another object, feature, or advantage to provide accurate data when there is a power discrepancy between two devices with similar sensor sets.

It is a yet another object, feature, or advantage to adjust and readjust based upon the energy consumption mechanisms. If power drops at the second device to a point lower than the first, readjustment of the system is performed, again in order to maintain personal area network function for the longest possible time.

It is another object, feature, or advantage to maximize the user experience via the extension of the battery life to the longest term possible.

It is another object, feature, or advantage to provide an improved set of ear pieces.

One of more of these and/or other objects, features, or advantages will become apparent from the specification and claims that follow. It is to be understood that not all embodiments will have the same objects, features, or advantages and thus no single embodiment need provide each of these objects, features, or advantages.

According to one aspect, a system includes a first device comprising a housing, a battery disposed within the housing, an intelligent control disposed within the housing, a transceiver disposed within the housing and operatively connected to the intelligent control, and at least one sensor operatively connected to the intelligent control. The system further includes a second device comprising a housing, a battery disposed within the housing, an intelligent control disposed within the housing, a transceiver disposed within the housing and operatively connected to the intelligent control, and at least one sensor operatively connected to the intelligent control. The first device and the second device provide for balancing load by powering one or more of the biosensors in one of the first device or the second device and shifting functions to the other of the first device and the second device. One or both of the first and second devices may be wearable devices. One or both of the wearable devices may be earpieces. The sensors may include one or more biosensors such as pulse oximeters, temperature sensors, blood pressure sensors, EEGs, ATP sensors, lactic acid sensors, hemoglobin sensors, hematocrits, alcohol sensors, glucose sensors, and/or bilirubin sensors. The first and second devices may communicate through their transceivers and may be in operative communication with a personal area network.

According to another aspect, a first device includes a housing, a battery disposed within the housing, an intelligent control disposed within the housing, and a transceiver disposed within the housing and operatively connected to the intelligent control; and at least one sensor operatively connected to the intelligent control. The intelligent control is configured to monitor the battery, communicate data associated with the battery to a second device and determine whether or not to power down circuitry associated with one or more of the sensors to shift functionality to the second device. The first device may be a wearable device such as an earpiece. The sensors may include a biosensor.

According to another aspect, a method includes providing a first device comprising a housing, a battery disposed within the housing, an intelligent control disposed within the housing, a transceiver disposed within the housing and operatively connected to the intelligent control, and at least one sensor operatively connected to the intelligent control. The method further includes providing a second device comprising a housing, a battery disposed within the housing, an intelligent control disposed within the housing, a transceiver disposed within the housing and operatively connected to the intelligent control, and at least one sensor operatively connected to the intelligent control. The method further includes balancing load between the first device and the second device by powering one or more of the biosensors in one of the first device or the second device and shifting functions to the other of the first device and the second device. The first and/or the second devices may be wearable devices such as ear pieces. The sensors may include one or more biosensors.

DETAILED DESCRIPTION

Allocation of resources in the most efficient manner is of critical importance in the ongoing utility of the device within a network such as a wearable device in a personal area network or a single ear piece within a set of ear pieces. In a personal area network, processing may be performed by one or more devices simultaneously, effectively replicating the work, thereby unnecessarily consuming more of the scarce resource than is actually required.

The present invention provides for load balancing of the functions of each of the devices within a personal area network utilizing two devices with similar sensors and functional capabilities. Operative control of each of the devices is optimized by selection of one of the devices to perform a function is achieved in order to maximize battery life. This has the effect of maintaining consistent, high quality measurements while simultaneously preventing unnecessary consumption of power.

For example, two devices of the personal area network are equipped with identical biosensors or overlapping sets of biosensors. One of the devices in the array is tasked with more duties than its counterpart. This device would consume more energy due to the other requirements placed upon it by the intelligent control. As such, the battery power remaining on this device may drop considerably over time. In this example, this device may consume power to such a degree that the remaining power available for function is, say 20% while its counterpart is at 80%. The intelligent control will then balance the load by powering down the sensor group in the low battery unit, while shifting this task to the other unit with the higher remaining battery life. This allows both devices to function in the most efficient fashion for the tasks required of both within the network. Due to load balancing, the user is able continue to utilize each of the devices in the personal area network for the longest possible time.

Figure 1:
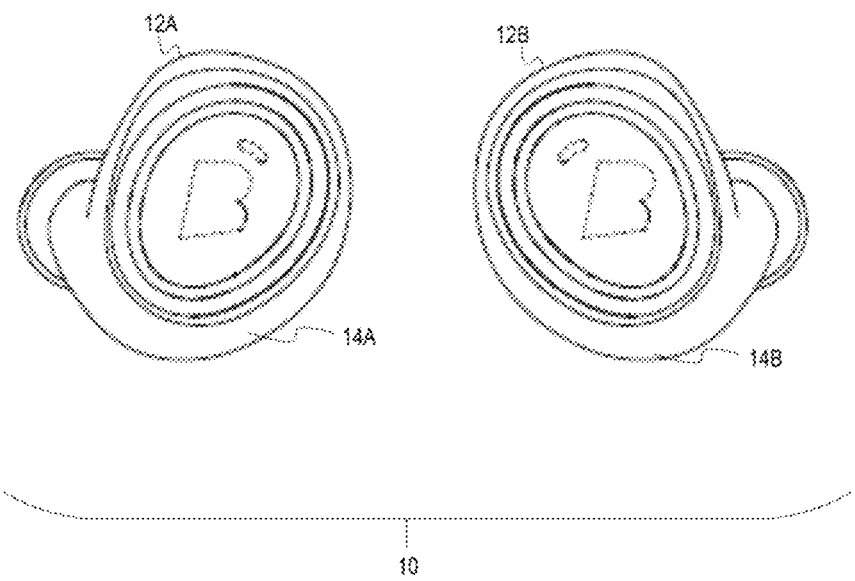
FIG. 1 illustrates a first device and a second device.

FIG. 1 illustrates an example of two devices. In the example shown, both the devices are wearable devices and in particular, both are earpieces. It is to be understood that the devices need not be wearable devices, let alone earpieces but may be other types of devices. It is to be further understood that the devices need not be the same type of device (such as both being earpieces) but can be different types of devices if there is sufficient overlap in functionality of the devices.

As shown in FIG. 1, there is a system 10 which includes a first device 12A and a second device 12B. The first device has a housing 14A and the second device has a housing 14B.

Figure 2:
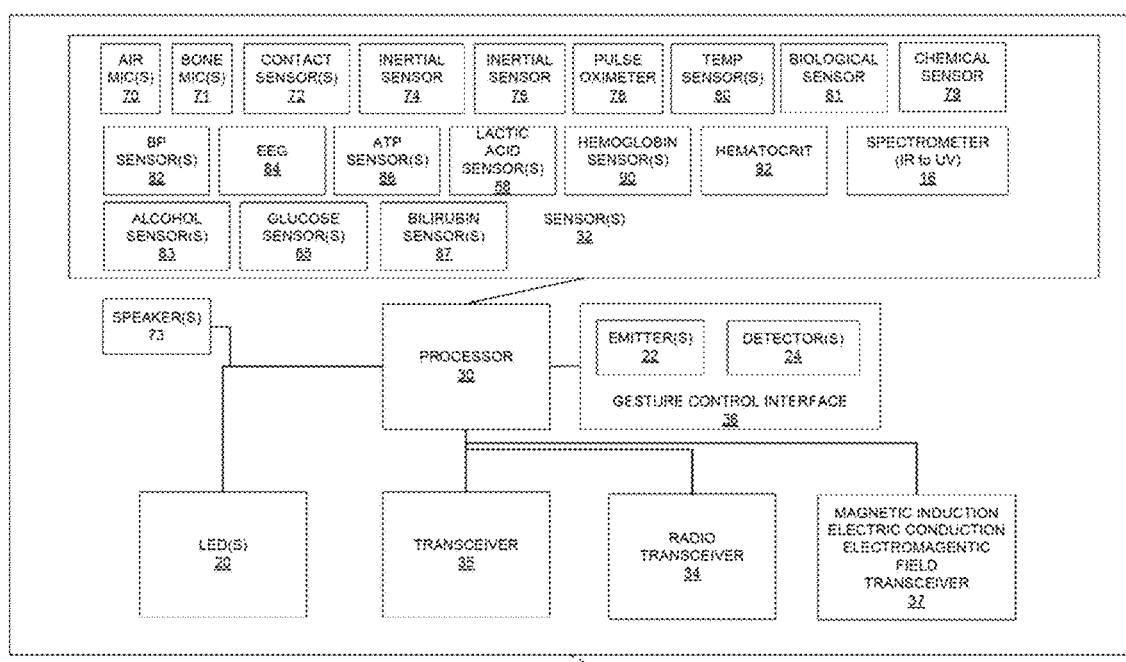
FIG. 2 illustrates a block diagram of the first device.

FIG. 2 illustrates a block diagram of the first device with a housing 14A. The first device as shown includes a processor disposed within the housing 14A. A gesture control interface 36 may be operatively connected to the processor 30. The gesture control interface 36 may include one or more emitters 22 and one or more detectors 24. The processor 30 may also be operatively connected to a radio transceiver 34 and/or transceiver 35 such as a near field magnetic induction (NFMI) transceiver and/or a transceiver 37 such as a magnetic induction electric conduction electromagnetic field transceiver. Of course, it is contemplated that other types of transceivers may also be used. One or more of the transceivers may be used for communicating with another device such as another earpiece. The processor 30 is operatively connected to one or more speakers 73 and one or more light emitting diodes (LEDs) 20. The processor 30 is also operatively connected to one or more sensors 32. Examples of sensors may include, without limitation, one or more air microphones 70, one or more bone microphones 71, one or more contact sensors 72, one or more inertial sensors 74, 76 (including accelerometers, magnetometers, gyro sensors, or other types of inertial sensors), a pulse oximeter 78, one or more temperature sensors 80, a biological sensor 81, a chemical sensor 79, a blood pressure sensor 82, an EEG 84, an ATP sensor 86, a lactic acid sensor 88, a hemoglobin sensor 90, a hematocrit 92, a spectrometer 16, an alcohol sensor 83, a glucose sensor 85, a bilirubin sensor 87, or other type of sensor.

Figure 3:
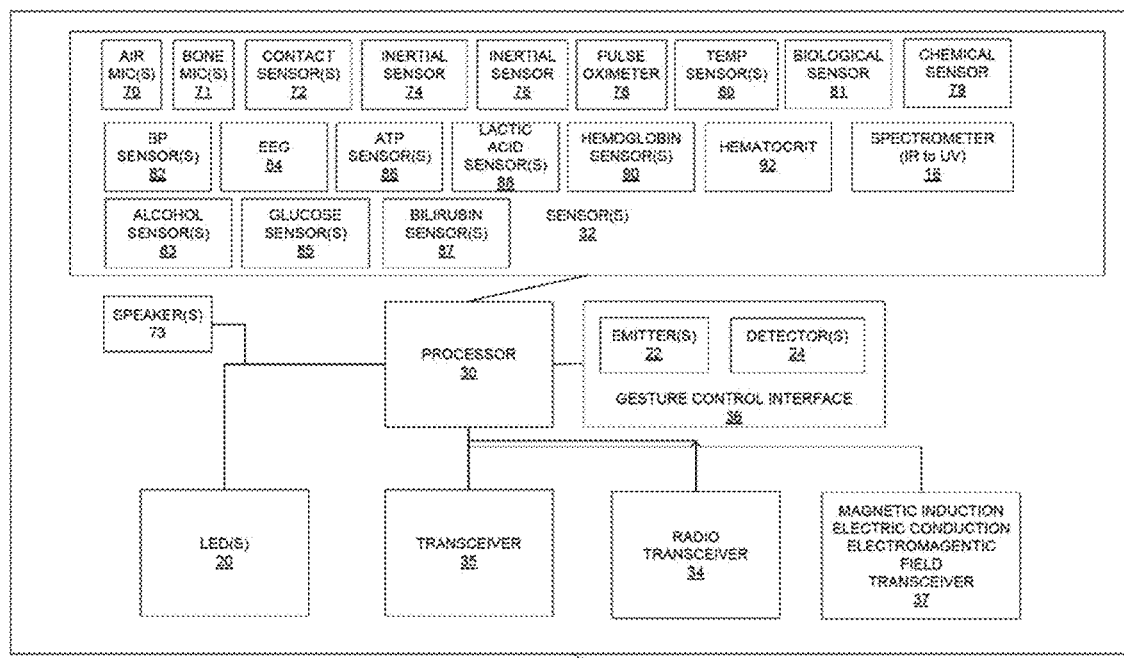
FIG. 3 illustrates a block diagram of the second device.

FIG. 3 illustrates a block diagram of the second device. Note that in this example, the same functionalities shown in FIG. 2 are present in the second device with its housing 14B. It is to be understood, however, that although some overlap in functionality is contemplated, different devices may have different function sets.

For example, consider two devices which have an overlapping function set. The devices may be a left earpiece and a right earpiece. Each device may consume power at a base rate when the device is operating but not performing any special functions. When a first function is performed, each device may consume power at a higher rate. Similarly, when a second function is performed, each device may consume power at a higher rate than the base rate. Similarly, when a third function is performed, each device may consume power at a higher rate than the base rate. When two or more of the first function, second function, and/or the third function is performed then each device may consume power at an even higher rate. Thus, each device when operational is always consuming some power and the more extra functions being performed, the higher the rate of power consumption.

For example, suppose each device has 200 mA hours of charge stored and consumes 30 mA in a base state. Suppose each device consumes an additional 20 mA if performing a first sensor function, an additional 20 mA if performing a second sensor function, and an additional 40 mA if performing a third function. For this example, assume power consumption is additive so that if all sensor functions are being used including the first sensor function and the second sensor function and the third sensor function, then the total current would be base state (30 mA)+first sensor function (20 mA)+second sensor function (20 mA)+third sensor function (40 mA)=110 mA.

Below are tables showing battery use for both a left earpiece and a right earpiece for purposes of illustration. Note that the left ear piece and the right ear piece are performing the same functions in this example.

| LEFT EARPIECE | | | |
| --- | --- | --- | --- |
| Time | Functions | Current | Remaining Charge at start of time period |
| 0 | Base | 30 mA | 200 mA hours |
| .25 hours | Base + First | 50 mA | 192.5 mA hours |
| .5 hours | Base + First + Second | 70 mA | 180 mA hours |
| 0.75 hours | Base + First + Second + Third | 110 mA | 162.5 mA hours |
| 1.0 hours | Base + Third | 70 mA | 135 mA hours |
| 1.25 hours | Base + Third | 70 mA | 117.5 mA hours |
| 1.5 hours | Base | 30 mA | 100 mA hours |
| 1.75 hours | Base + Second | 50 mA | 92.5 mA hours |
| 2.0 hours | Base + Second | 50 mA | 80 mA hours |
| 2.25 hours | Base + Second + Third | 90 mA | 72.5 mA hours |
| 2.5 hours | Base + Second + Third | 90 mA | 50 mA hours |
| 2.75 hours | Base + First + Second + Third | 110 mA | 27.5 mA hours |
| 3.0 hours | — | — | 0 mA hours |

| | RIGHT EARPIECE | | |
|---|---|---|---|
| Time | Functions | Current | Remaining Charge at start of time period |
| 0 | Base | 30 mA | 200 mA hours |
| .25 hours | Base + First | 50 mA | 192.5 mA hours |
| .5 hours | Base + First + Second | 70 mA | 180 mA hours |
| 0.75 hours | Base + First + Second + Third | 110 mA | 162.5 mA hours |
| 1.0 hours | Base + Third | 70 mA | 135 mA hours |
| 1.25 hours | Base + Third | 70 mA | 117.5 mA hours |
| 1.5 hours | Base | 30 mA | 100 mA hours |
| 1.75 hours | Base + Second | 50 mA | 92.5 mA hours |
| 2.0 hours | Base + Second | 50 mA | 80 mA hours |
| 2.25 hours | Base + Second + Third | 90 mA | 72.5 mA hours |
| 2.5 hours | Base + Second + Third | 90 mA | 50 mA hours |
| 2.75 hours | Base + First + Second + Third | 110 mA | 27.5 mA hours |
| 3.0 hours | — | — | 0 mA hours |

For the next set of tables, all of the same functions are being performed at the same time, but due to application of the methodology described, only one earpiece is performing the functions.

| | LEFT EARPIECE | | |
|---|---|---|---|
| Time | Functions | Current | Remaining Charge at start of time period |
| 0 | Base | 30 mA | 200 mA hours |
| .25 hours | Base + First | 50 mA | 192.5 mA hours |
| .5 hours | Base + First | 50 mA | 180 mA hours |
| 0.75 hours | Base + First + Second | 70 mA | 167.5 mA hours |
| 1.0 hours | Base + Third | 70 mA | 150 mA hours |
| 1.25 hours | Base | 30 mA | 128.5 mA hours |
| 1.5 hours | Base | 30 mA | 111 mA hours |
| 1.75 hours | Base + Second | 50 mA | 103.5 mA hours |
| 2.0 hours | Base | 30 mA | 91 mA hours |
| 2.25 hours | Base + Third | 70 mA | 83.5 mA hours |
| 2.5 hours | Base + Third | 70 mA | 66 mA hours |
| 2.75 hours | Base + Third | 70 mA | 48.5 mA hours |
| 3.0 hours | Base | 30 mA | 41 mA hours |
| 3.25 hours | Base | 30 mA | 33.5 mA hours |
| 3.5 hours | Base | 30 mA | 26 mA hours |
| 3.75 hours | Base | 30 mA | 18.5 mA hours |
| 4.0 hours | Base | 30 mA | 11 mA hours |
| 4.25 hours | Base | 30 mA | 3.5 mA hours |
| 4.5 hours | Base | 30 mA | — |

| | RIGHT EARPIECE | | |
|---|---|---|---|
| Time | Functions | Current | Remaining Charge at start of time period |
| 0 | Base | 30 mA | 200 mA hours |
| .25 hours | Base | 30 mA | 192.5 mA hours |
| .5 hours | Base + Second | 50 mA | 185 mA hours |
| 0.75 hours | Base + Third | 70 mA | 172.5 mA hours |
| 1.0 hours | Base | 30 mA | 155 mA hours |
| 1.25 hours | Base + Third | 70 mA | 127.5 mA hours |
| 1.5 hours | Base | 30 mA | 110 mA hours |
| 1.75 hours | Base | 30 mA | 102.5 mA hours |
| 2.0 hours | Base + Second | 50 mA | 95 mA hours |
| 2.25 hours | Base + Second | 50 mA | 82.5 mA hours |
| 2.5 hours | Base + Second | 50 mA | 70 mA hours |
| 2.75 hours | Base + First + Second | 70 mA | 57.5 mA hours |
| 3.0 hours | Base | 30 mA | 40 mA hours |
| 3.25 hours | Base | 30 mA | 32.5 mA hours |
| 3.5 hours | Base | 30 mA | 25 mA hours |
| 3.75 hours | Base | 30 mA | 17.5 mA hours |
| 4.0 hours | Base | 30 mA | 10 mA hours |
| 4.25 hours | Base | 30 mA | 2.5 mA hours |
| 4.5 hours | Base | 30 mA | — |

Note that in the above example the overall length between charges is increased significantly by moving functions from one ear piece to another ear piece to avoid duplication of efforts. In addition, note that in this example, the battery life of the first ear piece and that of the second ear piece extend to about the same time period to avoid having one earpiece run out of battery significantly before the other earpiece. Thus, when load sharing is used the amount of time before the battery is depleted is prolonged a significant amount. There are periods of time where one device may be using very little battery power while the other device is using battery power. Such a situation may occur when sensors or other portions of one of the devices are turned off in order to decrease power consumption and those functions are performed by the other device. It should also be appreciated that a number of different methods or algorithms may be used in order to extend battery life. The particular methods used may be dependent upon the type of devices, the functions associated with the devices, and other factors.

For example, where both devices are earpieces and both earpieces perform the same or largely the same functions, the methodology may provide for extending the battery life of both devices to generally the same time period. This may be accomplished in a variety of ways. For example, this may be accomplished by comparing the charge level or estimated battery life of one device to the charge level or estimated battery life of the other device. Where both devices are capable of performing the same functions, the device with a greater charge level or greater remaining battery life may be tasked with performing the function while the other device may power down portions of the device used in performing the functions. Alternatively, a set point or threshold may be used such that only when the difference between the charge levels of the devices meets the threshold is functionality necessarily transferred to the device with a greater charge level. It is further contemplated that more complex types of analysis may be performed including look ahead or predictive scheduling of resources if sufficient information exists regarding predicted usage of the devices.

It is further contemplated that for some functions it may not necessarily be redundant to perform the same functions with multiple devices. In such instances, the devices may function normally without having portions of one of the devices power down to conserve power. It is further to be understood that not the left earpiece may have functionality different from the right earpiece such as some biological sensors may be present in only of the earpieces.

Figure 4:
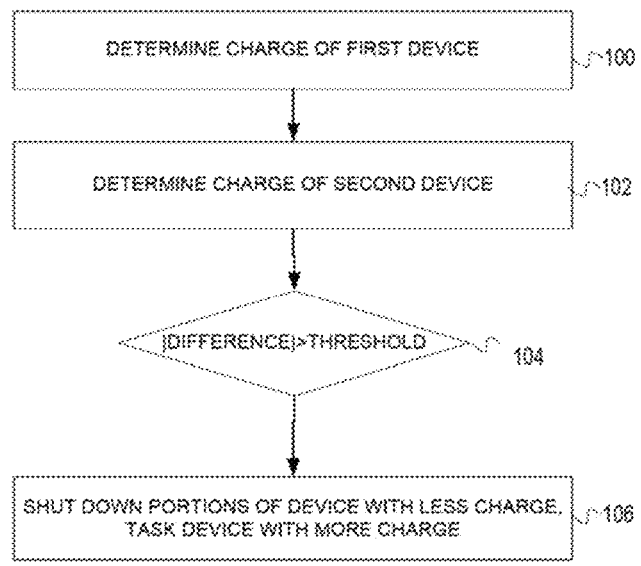
FIG. 4 illustrates one example of battery consumption without load sharing.

FIG. 4 illustrates one example of a methodology. As shown in FIG. 4, in step 100 a determination is made regarding the charge level or remaining battery life of a first device. In step 102 a determination is made regarding the charge level or remaining battery life of the second device. In step 104 the absolute value of the difference between the charge levels is determined. Then in step 106 portions of the device with less remaining charge are shutdown if appropriate and the device with more charge is tasked with those functions.

Figure 5:
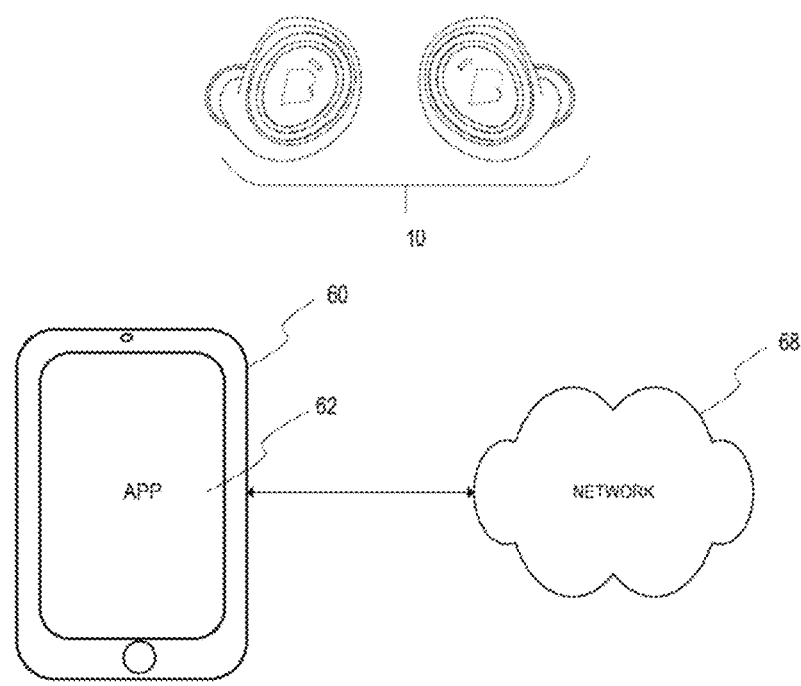
FIG. 5 illustrates one example of a system.

FIG. 5 illustrates one example of a system. A set of devices 10 are in operative communication with a computing device such as a mobile device 60. A software application such as a mobile 62 may be executing on the mobile device 60. The software application may communicate information over a network 68 such as the Internet. It is contemplated that the mobile app 62 may be used to change power management settings associated with the devices 10. Thus, for example, a user could adjust settings regarding whether or not load sharing is used or the conditions which must occur before load sharing is used. In addition, with user consent, information about battery use and sensor use may be communicated from the devices 10 over the network to a remote server in order to provide additional data points for analysis to improve algorithms for load sharing or to select the most appropriate algorithms for load sharing for a particular user.

Therefore, although various examples of methods for load balancing have been shown and described, it is to be understood that the present invention contemplates numerous variations, options, and alternatives which may be appropriate in different environments, for different types of devices, and dependent upon the amount of overlap of functionality of the different devices.

What is claimed:

1. A system comprising:
a first earpiece comprising a housing, a battery disposed within the housing, an intelligent control disposed within the housing, a transceiver disposed within the housing and operatively connected to the intelligent control, at least one sensor operatively connected to the intelligent control, and a speaker operatively connected to the intelligent control;
a second earpiece comprising a housing, a battery disposed within the housing, an intelligent control disposed within the housing, a transceiver disposed within the housing and operatively connected to the intelligent control, at least one sensor operatively connected to the intelligent control, and a speaker operatively connected to the intelligent control;
wherein the first earpiece and the second earpiece both perform a first set of functions, the first earpiece performs a second set of functions which are not performed by the second earpiece, the second earpiece has a third set of functions performed that are not performed by the first earpiece, and a fourth set of functions which are performed by the first earpiece and the second earpiece working together;
wherein the first earpiece and the second earpiece provide for balancing load by powering one or more of the sensors and portions including the transceiver and speaker in one of the first device earpiece or the second earpiece and shifting one or more functions of the first set of functions to the other of the first earpiece and the second earpiece so that the battery life of the first earpiece and the battery life of the second earpiece extend to about the same period; and
wherein the first earpiece and the second earpiece perform predictive scheduling of the battery life of the first earpiece and the battery life of the second earpiece using predictive usage information when balancing the load.

2. The system of claim 1 wherein the first earpiece is a first wearable device and the second earpiece is a second wearable device.

3. The system of claim 1 wherein the at least one sensor of the first earpiece and the at least one sensor of the second earpiece each comprise at least one biosensor.

4. The system of claim 3 wherein the at least one biosensor of the first earpiece and the at least one biosensor of the second earpiece both include a pulse oximeter.

5. The system of claim 3 wherein the at least one biosensor of the first earpiece and the at least one biosensor of the second earpiece both include a temperature sensor.

6. The system of claim 3 wherein the at least one biosensor of the first earpiece and the at least one biosensor of the second earpiece both include at least one of a blood pressure sensor, an EEG, an ATP sensor, a lactic acid sensor, a hemoglobin sensor, a hematocrit, an alcohol sensor, a glucose sensor, and a bilirubin sensor.

7. The system of claim 1 wherein the first earpiece and the second earpiece are in operative communication through the transceiver of the first earpiece and the transceiver of the second earpiece.

8. The system of claim 1 wherein the transceiver of the first earpiece and the transceiver of the second earpiece are in operative communication in a personal area network.

9. The system of claim 1 wherein the first earpiece and the second earpiece have an overlapping function set.

10. A set of earpieces comprising:
a first earpiece comprising a first housing, a battery disposed within the first housing, a first intelligent control disposed within the first housing, a transceiver disposed within the first housing and operatively connected to the first intelligent control and at least one sensor operatively connected to the first intelligent control;
a second earpiece comprising a second housing, a battery disposed within the second housing, a second intelligent control disposed within the second housing, a transceiver disposed within the second housing and operatively connected to the second intelligent control and at least one sensor operatively connected to the second intelligent control;
wherein the first earpiece and the second earpiece both perform a first set of functions, the first earpiece performs a second set of functions which are not performed by the second earpiece, the second earpiece has a third set of functions performed that are not performed by the first earpiece, and a fourth set of functions which are performed by the first earpiece and the second earpiece working together;
wherein the first intelligent control is configured to monitor the battery, communicate data associated with the battery to the second earpiece, determine whether or not to power down circuitry associated with the at least one sensor of the first earpiece, and to shift one or more of the functions of the first set of functions to the second earpiece if the circuitry associated with the at least one sensor of the first earpiece is powered down, based upon predictive scheduling of the battery life of the first earpiece and the battery life of the second earpiece using predictive usage information when balancing a load.

11. The set of earpieces of claim 10 wherein the first earpiece is a wearable device and the first housing is a wearable housing.

12. The set of earpieces of claim 11 wherein the at least one sensor of the first earpiece includes at least one biosensor.

13. The set of earpieces of claim 12 wherein the at least one biosensor includes a pulse oximeter.

14. The set of earpieces of claim 12 wherein the at least one biosensor includes a temperature sensor.

15. The set of earpieces of claim 12 wherein the at least one biosensor includes at least one of a blood pressure sensor, an EEG, an ATP sensor, a lactic acid sensor, a hemoglobin sensor, a hematocrit, an alcohol sensor, a glucose sensor, and a bilirubin sensor.

16. The set of earpieces of claim 10 wherein the data comprises information associated with battery use and the at least one sensor use for improved load sharing and wherein the information is communicated to a remote server.

17. The set of earpieces of claim 16 wherein a mobile app on a mobile device is used to communicate the information associated with the battery use and the at least one sensor use for improved load sharing to the remote server.

18. A method comprising:
providing a first earpiece comprising a housing, a battery disposed within the housing, an intelligent control disposed within the housing, a transceiver disposed within the housing and operatively connected to the intelligent control, and at least one sensor operatively connected to the intelligent control;
providing a second earpiece comprising a housing, a battery disposed within the housing, an intelligent control disposed within the housing, a transceiver disposed within the housing and operatively connected to the intelligent control, and at least one sensor operatively connected to the intelligent control;
wherein the first earpiece and the second earpiece both perform a first set of functions, the first earpiece performs a second set of functions which are not performed by the second earpiece, the second earpiece has a third set of functions performed that are not performed by the first earpiece, and a fourth set of functions which are performed by the first earpiece and the second earpiece working together; balancing load between the first earpiece and the second earpiece via a personal area network by powering down one or more of the sensors in one of the first earpiece or the second earpiece and shifting one or more functions in the first set of functions that overlap to the other of the first earpiece and the second earpiece via the personal area network if a threshold associated with a difference between a battery charge level of the first earpiece and a battery charge level of the second earpiece is reached so that the battery life of the first earpiece and the battery life of the second earpiece extend to about the same period; and
wherein the first earpiece and the second earpiece perform predictive scheduling of the battery life of the first earpiece and the battery life of the second earpiece using predictive usage information.

19. The method of claim 18 wherein the first earpiece is a first wearable device and the second earpiece is a second wearable device.

* * * * *